Nov. 9, 1965    E. T. DUNCAN ETAL    3,217,231
LOW RIPPLE RECTIFIER
Filed Dec. 6, 1960
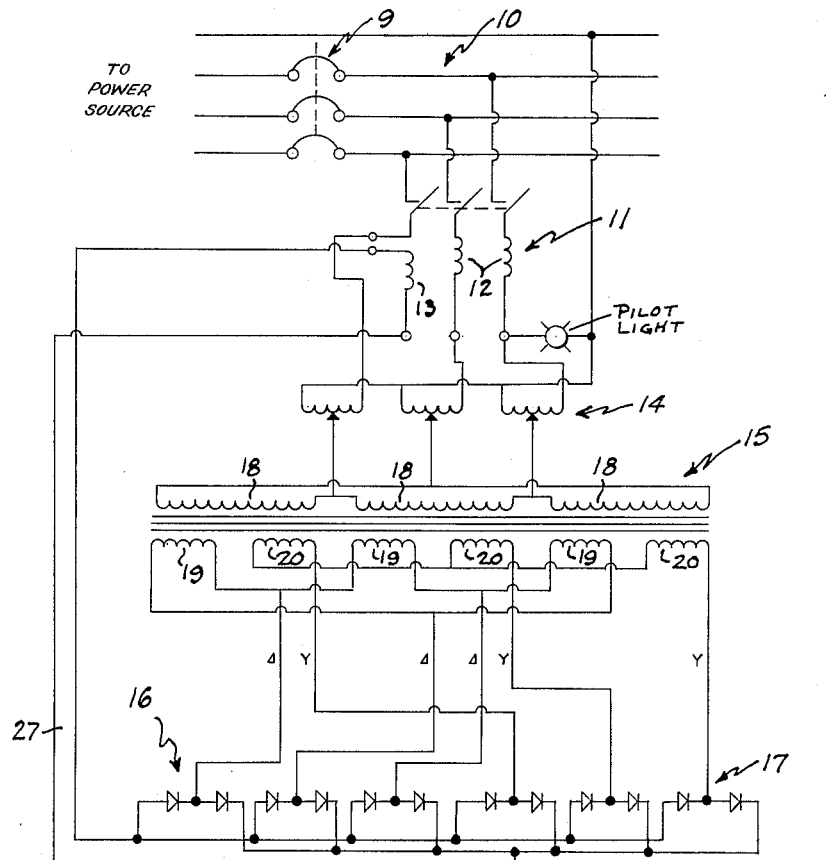
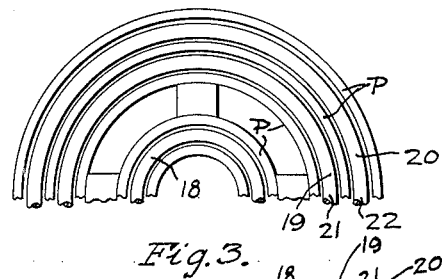
Fig. 3.
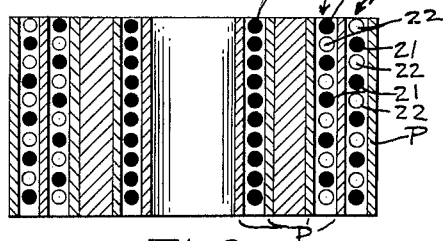
Fig. 2.
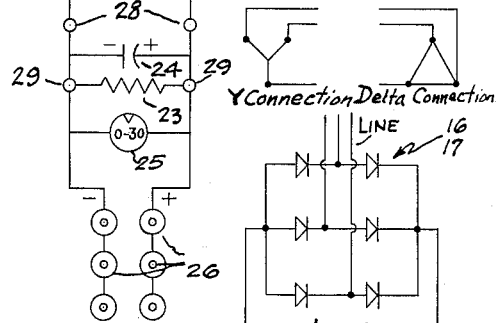
Fig. 4.
INVENTORS
Edward T. Duncan
BY George L. Krize
Wooster, Davis & Cifelli
ATTORNEYS.

United States Patent Office 3,217,231
Patented Nov. 9, 1965

3,217,231
LOW RIPPLE RECTIFIER
Edward T. Duncan, Bridgeport, and George L. Krize, Monroe, Conn., assignors, by mesne assignments, to Howard L. Steinhardt, Fairfield, Conn.
Filed Dec. 6, 1960, Ser. No. 74,071
3 Claims. (Cl. 321—5)

This invention relates to a rectifier circuit, and has for its principal object to provide a low ripple direct current source for laboratory experimentation in high schools and colleges, or any other application where such a current is desired.

It is also an object to provide a circuit in which a three-pole relay trip-type circuit breaker is employed to protect the current drain of an auto-transformer and special power transformer employed in the circuit and also protects the output of the rectifier.

It is another object of this invention to provide an improved power transformer which is particularly well suited for use in a low ripple rectifier circuit.

With the foregoing and other objects in view we have devised the novel circuit as illustrated in the accompanying drawing forming a part of this specification.

In this drawing:

FIG. 1 is a schematic drawing or wiring diagram of our improved rectifier circuit;

FIG. 2 is a diagrammatic section of a portion of the power transformer indicating the relative arrangement of the windings;

FIG. 3 is a diagrammatic top plan view of a portion thereof, and

FIG. 4 is a schematic drawing of the three-phase bridge rectifier.

The principal problem involved in securing a direct current source from an alternating current supply, particularly as applied to laboratory usage, is that it must have an extremely low ripple factor, the ripple factor being that amount of A.C. voltage that is permitted to pass through the rectifier over the D.C. signal intended by the rectifier. This is known as ripple factor or ripple voltage. In this improved rectifier circuit the ripple factor may be held down to in the vicinity of one percent.

This result is accomplished by this rectifier circuit employing as an illustrative example the following components and circuit, it being understood that different values for the various components may be used for different requirements.

Thus, for example, through a main breaker 9, a 208-volt 3-phase supply circuit 10 is applied to a 3-pole relay trip-type circuit breaker 11. It is a principal function of this trip-type breaker that two poles employ load coils 12, the third pole employing the relay trip mechanism 13. This circuit breaker functions in the circuit in the following manner: The 208-volt input passing through this breaker is montored by the two load coils in the breaker, which are protecting the current drain of the auto-transformer 14 and the special power transformer 15. The remaining pole of this breaker contains the relay trip coil mechanism indicated at 13, that is monitoring the load on the output or direct current coming from the three-phase bridge rectifiers 16 and 17. By employing this method of circuit protection, one circuit breaker can be used to adequately protect the A.C. input to the auto-transformer and the power transformer, while also protecting the output of the rectifier. In other words, it fully protects the A.C. input to the circuit as well as the D.C. loading.

As seen from the drawing, the load side of this circuit breaker passes the 208-volt A.C. supply into the primary of the variable auto-transformer 14, the output of which is connected to the delta connected primary 18 of the power transformer 15. It is the function of this variable auto-transformer to vary the voltage on the delta connected primary of the power transformer from 0 to 208 volts, thus making the entire subsequent output voltage variable throughout its range. As shown, the output of the auto-transformer is directly connected to the delta connected primary of the specially wound power transformer 15.

This power transformer is specially wound in that the secondary is a dual winding, comprising three coils 19 connected in delta and three coils 20 connected in Y. The two windings are wound side by side and their individual turns are interwound to afford a lower ripple output. Thus, as shown in FIG. 2, the individual turns 21 of the delta winding 19 are shown in solid black to distinguish from the individual turns 22 of the Y winding 20 shown as an open circle, and as indicated, the coils are wound side by side with the individual turns 21 of each delta winding alternating with the individual turns 22 of a Y winding. Thus, each delta winding 19 is interwound in this manner with a Y winding 20. The different layers of coils may be separated by fish paper P. The outputs of the dual winding, that is, the delta and the Y windings, are each connected to a three-phase bridge rectifier; thus, the delta winding 19 of the power transformer secondary is connected to the three-phase bridge rectifier 16, while the output from the Y winding 20 is connected to the three-phase bridge rectifier 17. The windings are so designed that the potential from phase to phase on the delta winding is equal to the potential from line to line on the Y winding. Furthermore, the voltage produced by each leg of the Y is in phase with the voltage produced by a corresponding side of the delta, thus bringing about the low ripple output on the D.C. side of the rectifiers. The rectifiers are connected in parallel, as indicated most clearly in FIG. 4, for current carrying capacity.

With this circuit, employing the specially wound power transformer, the low ripple factor is accomplished in this rectifier. The percentage of ripple factor present at points 28 is from .8 to 1.2 percent maximum. Further modification may be effected to bring the ripple factor still lower by introducing a bleeder resistor 23 and filter 24 across the D.C. output side of the rectifiers. By this means the ripple factor may be lowered to from $\frac{1}{10}$ of one percent to $\frac{8}{10}$ of one percent at the jacks 26. Ripple factor taken at points 29 ranges between 0.1 percent and .8 percent.

The regulation of this rectifier is within the range of normal rectifiers in that it maintains a regulation of about five percent from twenty percent of load to full load.

As indicated, the outputs from the rectifiers may be passed through the filter, bleeder resistor and instrument 25 to the terminal jacks 26 to which the connections to testing instruments or other load uses may be made. They may be distinguished by coloring the negative black and positive red. However, direct current from one side of this line coming from the rectifiers is passed back to the control coil 13 of the three-pole circuit breaker 11, as indicated at 27, and therefore this breaker will be actuated by any overload placed on the rectifier circuit from the D.C. side. The D.C. output at the jacks 26 may vary from 0–24 volts and 15 amps.

Examples of values of components of the circuit illustrated may be as follows:

Main breaker 9, Federal Pacific Electric NEF-431050R.

Breaker 11, Heinemann 3 PCB Cat. No. 3276 SK.

Auto-transformer 14, Superior Powerstat Type 20–3.

Power-transformer 15, 3 phase 208-volt delta primary, ±2½ and 5% taps to delta-Y secondary 25 volts.

Three phase bridge rectifiers 16 and 17, International rectifiers Cat. No. EITISTBKX (1 volt drop R.M.S.).

Filter 24, Industrial condenser 4000 MFD 50 wv.

Resistor 23, Ohmite resistor 28 ohms 160 w.

Voltmeter 25, Westinghouse Type K–25 Style No. 1730565.

Having thus set forth the nature of our invention, we claim:

1. A low ripple rectifier circuit comprising a variable auto-transformer, means for connecting the primary of this transformer to a three-phase supply circuit, a power transformer having a delta connected primary connected to the secondary of the auto-transformer, said power transformer having a dual wound secondary of which one component comprises three windings connected in delta and the other component three windings connected in wye, one winding of each component having a voltage output in phase with that of a winding of the other component, the line-to-line output voltage of the delta connected windings being equal to the line-to-line output voltage of the wye connected windings, said windings of the dual wound secondary being wound side by side with the individual turns of each delta winding alternating with the individual turns of a wye winding, a three-phase bridge rectifier means connected to the delta and wye windings of the power transformer secondary, and means for connecting the output from the bridge rectifier means to a load circuit.

2. A low ripple rectifier circuit comprising a variable auto-transformer, means for connecting the primary of this transformer with a three-phase supply circuit, a three-pole relay trip-type circuit breaker in the connection between the supply circuit and the auto-transformer with one pole including a coil connected to operate the relay trip mechanism of the circuit breaker, a power transformer having a delta wound primary connected to the secondary of the auto-transformer, said power transformer having a secondary comprising a dual winding one of which comprises three windings connected in delta and the other three windings connected in wye, said windings of the dual wound secondary being wound side by side with the individual turns of each delta winding alternating with the individual turns of a wye winding, the voltage outputs of the interwound windings being in phase with one another and the voltage of each Y winding being substantially equal to $$\frac{V}{\sqrt{3}}$$

where V equals the voltage output of its corresponding delta winding, a three-phase bridge rectifier connected to the delta winding of power transformer secondary, a second three-phase bridge rectifier connected to the Y winding of the power transformer secondary, means connecting the output side of the bridge rectifiers to a load circuit, and means for feeding direct current from the output from the bridge rectifiers to the relay trip coil of the circuit breaker.

3. A power transformer comprising: a core having three winding legs; a primary winding on each of said legs, the three primary windings being connected in delta; and a secondary winding on each of said legs, each secondary winding including a first coil and a second coil wound side by side and interwound by having the individual turns of the first coil alternating with the individual turns of the second coil, the voltage outputs of said first and second coils being in phase, the three first coils being connected in delta and the three second coils being connected in wye, the line-to-line output voltage of the delta connected secondary coils being equal to the line-to-line output voltage of the wye connected secondary coils.

References Cited by the Examiner

UNITED STATES PATENTS

| | | | |
|---|---|---|---|
| 1,722,097 | 7/29 | Kern | 321—12 |
| 2,315,599 | 4/43 | Cox et al. | 321—14 |
| 2,482,489 | 9/49 | Kaiser | 336—12 |
| 2,733,399 | 1/56 | Derr et al. | 321—14 |
| 2,759,140 | 8/56 | Lewis | 321—8 |
| 2,773,970 | 12/56 | Galbraith et al. | 321—5 |
| 2,820,189 | 1/58 | Uhlmann | 321—27 |

LLOYD McCOLLUM, *Primary Examiner.*

SAMUEL BERNSTEIN, RALPH D. BLAKESLEE,
*Examiners.*